R. C. BARTON.
FASTENING DEVICE.
APPLICATION FILED MAR. 14, 1919.
1,370,680.  Patented Mar. 8, 1921.
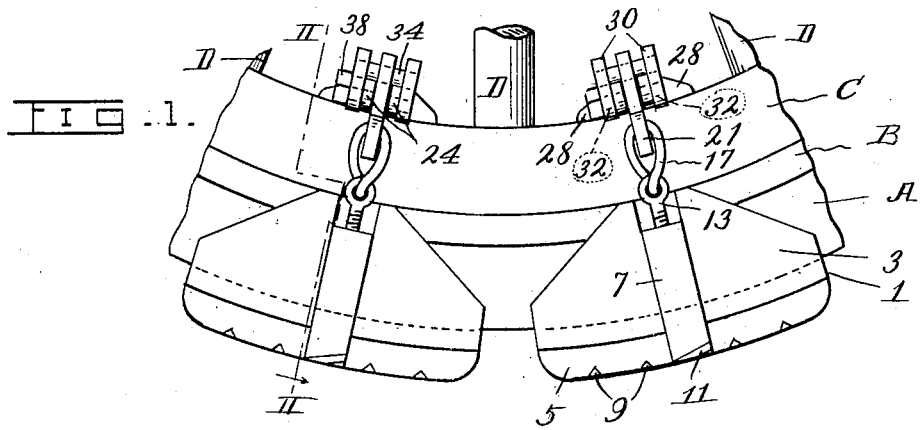
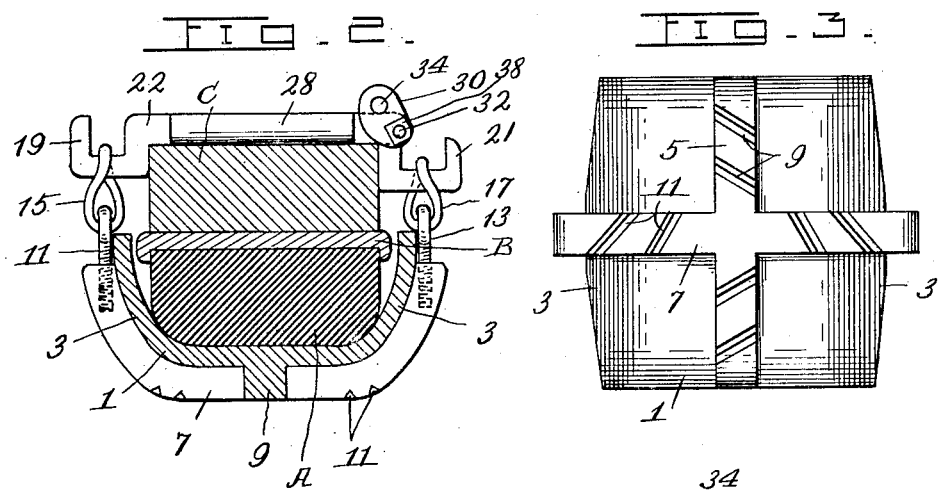
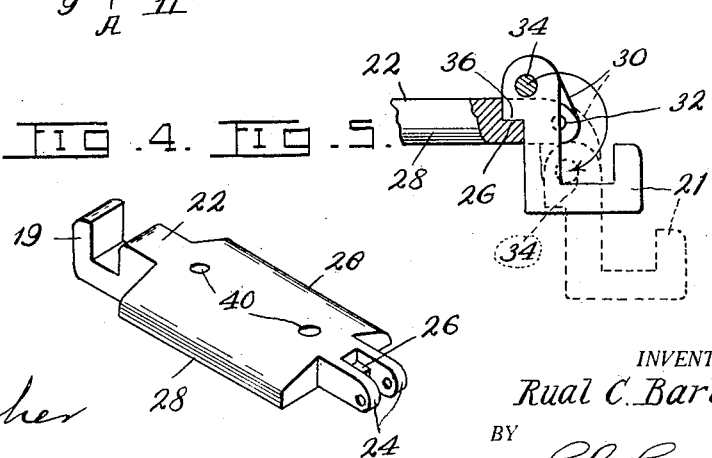
WITNESS:
L. J. Fischer
INVENTOR.
Rual C. Barton,
BY
F. G. Fischer,
ATTORNEY.

UNITED STATES PATENT OFFICE.

RUAL C. BARTON, OF KIRKSVILLE, MISSOURI.

FASTENING DEVICE.

1,370,680.  Specification of Letters Patent.  Patented Mar. 8, 1921.

Application filed March 14, 1919. Serial No. 282,569.

*To all whom it may concern:*

Be it known that I, RUAL C. BARTON, a citizen of the United States, residing at Kirksville, in the county of Adair and State of Missouri, have invented certain new and useful Improvements in Fastening Devices, of which the following is a specification.

My invention relates to improvements in fastening devices for nonskid tire shoes, and one object is to provide a comparatively simple and inexpensive device of this character which is well adapted for securing nonskid shoes on truck and other vehicle wheels to increase their tractive force and prevent them from slipping on muddy or slippery roads.

Other objects of the invention will hereinafter appear, and in order that said invention may be fully understood, reference will now be made to the accompanying drawing, in which:

Figure 1 is a fragmentary side elevation of a vehicle wheel equipped with the devices.

Fig. 2 is an irregular sectional view on line II—II of Fig. 1.

Fig. 3 is an inverted plan view of a shoe body.

Fig. 4 is a detail perspective view of a transverse lock-bar employed in carrying out the invention.

Fig. 5 is a fragmentary side elevation of the lock bar partly in section with elements associated with one end of said lock-bar.

A designates the rubber tire, B the rim, C the felly, and D the spokes of a vehicle wheel of ordinary or preferred construction.

1 designates the body of the shoe. The transverse portion and the sides of the body 1 are armed with intersecting reinforcing ribs 5 and 7 adapted to grip the surface of the road and thus prevent the wheel from skidding in any direction. The ribs 5 and 7 have corrugated surfaces 9 and 11, respectively, to increase their road gripping properties.

The ends of the rib 7 are internally threaded to receive screw eyes 11 and 13, provided with links 15 and 17 for engagement with hooks 19 and 21, respectively. The hook 19 is formed integral with one end of the transverse lock bar 22 which is provided at its opposite end with a pair of spaced ears 24 having a shoulder 26 arranged between them for a purpose which will hereinafter appear. Extensions 28 are formed at opposite sides of the bar 22 to overcome any tendency of said bar to rock on the felly C when the device is in active position.

30 designates a pair of rockable members connected to the ears 24 by pivots 32 and united at their free ends with a transverse pin 34, which extends through one end of the hook 21 and operably secures the same to said members 30. The hook 21 is provided with a shoulder 36 adapted to rest upon the shoulder 26 and thus relieve the pins 32 and 34 of practically all stress when the device is in the active position disclosed by Figs. 1 and 2. One of the rockable members 34 is provided with a rectangular shoulder 38, for engagement with a wrench whereby the members 30 can be rocked to the full and dotted line positions disclosed by Fig. 5.

In practice the transverse members or lockbars 22 are spaced around the inner periphery of the felly C and if desired may be permanently secured to said felly by screws or other suitable means passing through holes 40 in said lock-bars 22. A shoe or body 1 is then attached to each transverse member 22 by placing the links 15 and 17 over the hooks 19 and 21, respectively. This is readily accomplished after the hook 21 is lowered to the dotted line position disclosed by Fig. 5, after which all slack is taken up by raising the hook 21 until its shoulder 36 rests upon the shoulder 26, which is accomplished by swinging the members 30 upwardly on the pivots 32 until the pin 34 rests on top of the bar 22. When in the last-mentioned position, the pin 34 passes back of a line extending vertically through the pins 32 and hence there is no danger of the members 30 accidentally allowing the device to come off the wheel. Prior to applying the device to the wheel the screw eyes 11 and 13 are first adjusted, so that after the device is applied to the wheel and the members 30 are swung to their active position, the body 1 will be firmly drawn against the tire A, so that there will be no creepage of the shoe on the tire.

Although the device is intended more for use on solid rubber tires, such as are commonly employed on motor trucks, it may be used successfully with pneumatic tires employed on passenger cars.

From the foregoing description it is apparent that I have provided a device well adapted for the purposes intended, and while I have shown and described the preferred form of my invention, I reserve the right to make such changes in the construction, combination and arrangement of parts, as properly fall within the spirit and scope of the claims.

Having thus described my invention, what I claim and desire to secure by Letters Patent, is:

1. A fastening device of the character described consisting of a transverse member, a rockable member mounted at one end of said transverse member, a hook carried by said rockable member, a shoulder on said hook, and a shoulder on the transverse member for supporting the shoulder on the hook.

2. A fastening device consisting of a transverse member, a pair of rockable members mounted at one end of said transverse member, a cross member uniting said rockable members and adapted to limit their movement in one direction by contacting the transverse member, and a hook carried by the transverse member.

In testimony whereof I affix my signature, in the presence of two witnesses.

RUAL C. BARTON.

Witnesses:
 JENNIE B. LINK,
 MARY J. NICOLSON.